Aug. 2, 1949.    G. W. FORMAN    2,477,868
LOW PITCH REMOVABLE MECHANICAL STOP
Filed April 17, 1946    2 Sheets-Sheet 1
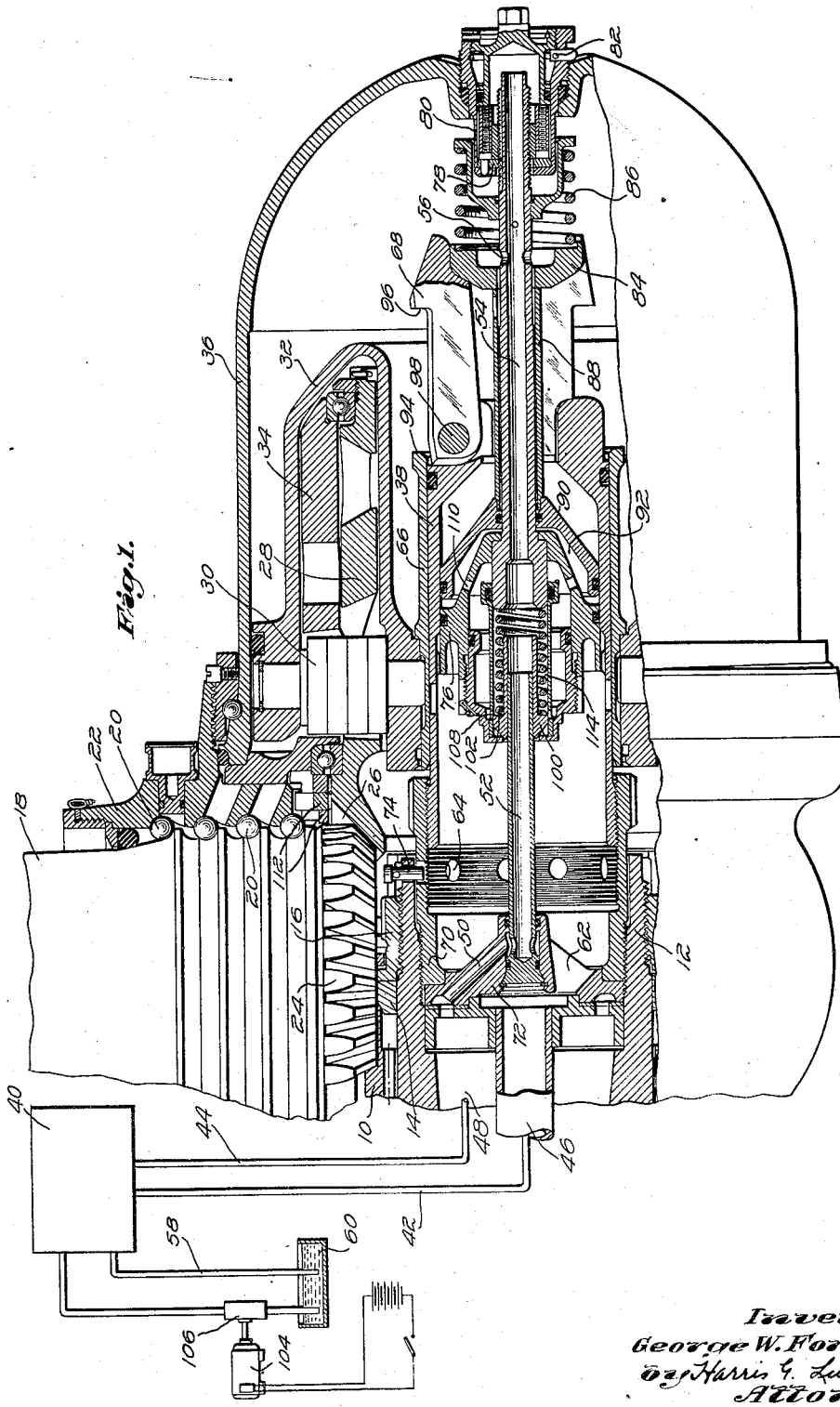
Inventor
George W. Forman
by Harris G. Luther
Attorney

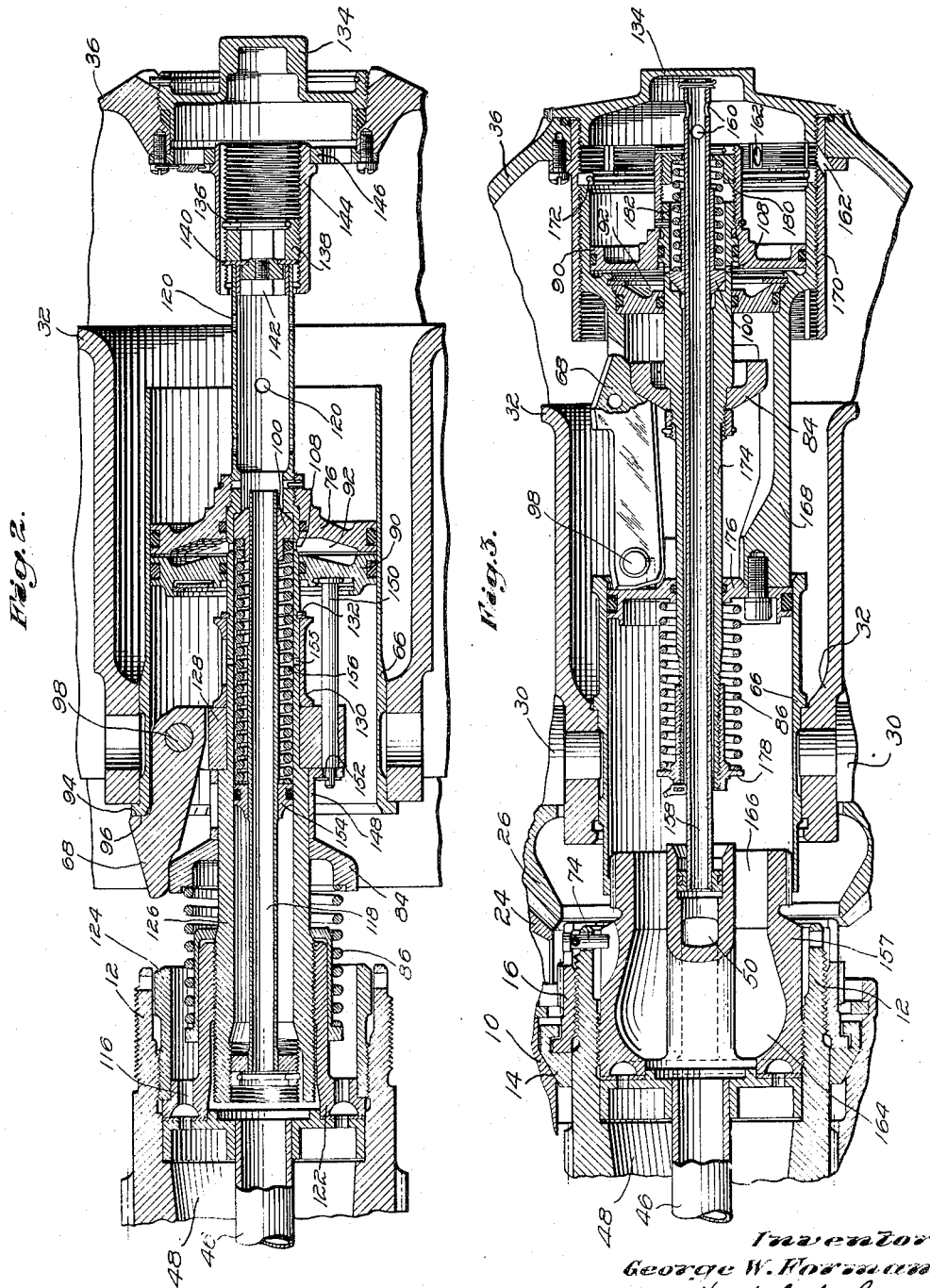

Patented Aug. 2, 1949

2,477,868

UNITED STATES PATENT OFFICE 2,477,868

LOW-PITCH REMOVABLE MECHANICAL STOP

George W. Forman, Kansas City, Mo., assignor to United Aircraft Corporation, East Hartford, Conn., a corporation of Delaware Application April 17, 1946, Serial No. 662,746

19 Claims. (Cl. 170—160.32)

1

This invention relates to stops for propeller pitch changing mechanism and specifically to hydraulically controlled mechanical intermediate pitch stops.

In propellers having pitch changing means capable of turning the blades beyond a normal operative, usually automatically controlled, range into extreme or special purpose ranges such as feathering or reverse pitch positions, provision must be made to positively limit the normal range and to prevent accidental or inadvertent movement beyond said range into the extreme or special purpose ranges. Stops for so limiting the range must not only be positive in action, but must be readily and reliably removable to assure efficient operation of the pitch changing mechanism.

An object of this invention is a mechanical stop that will positively limit the movement of propeller pitch changing mechanism but which may be readily retracted under load.

Another object is an adjustable stop for a completely enclosed pitch changing mechanism.

Another object is a stop which is effective against the action of the centrifugal twisting moment of the blades and which is urged to stop position by the action of centrifugal force thereon.

A still further object is stop locking mechanism which will positively lock the stop in active position, but which may be readily hydraulically retracted under load to unlock the stop and permit retraction of the stop.

Another object is a hydraulically controlled mechanism that may be assembled with or removed from the pitch changing mechanism as a unit.

Other objects and advantages will be apparent from the specification and claims, and from the accompanying drawings which illustrate what is now considered to be a preferred embodiment of the invention.

In the drawings,

Fig. 1 is a longitudinal section through a propeller and its pitch changing mechanism mounted on a driving shaft with the governor and its connections schematically shown.

Fig. 2 is a longitudinal section showing a modification of the stop mechanism shown in Fig. 1, and Fig. 3 is a longitudinal section showing another

2 modification of the stop mechanism shown in Fig. 1.

The drawings show a double-acting propeller adapted to be controlled by a governor and control mechanism of the type disclosed in co-pending U. S. application Serial No. 464,621, now U. S. Patent No. 2,402,065, of Erle Martin to which reference may be made for a more complete disclosure of the governor and its controls. The details of the governor are not shown in this application as it is believed that they are not necessary to a complete understanding of this invention, as any governor which will supply fluid under pressure to either side of the propeller pitch changing piston to varying the pitch and maintain substantially constant speed and which includes mechanism by which fluid at a higher pressure may be supplied to one side of the piston while the other side is connected with drain or a reduced pressure will satisfactorily operate the stops forming the subject matter of the present invention.

The devices shown in Figs. 1 and 3 apply fluid to the front or outboard side of the piston to increase the propeller pitch and apply fluid under pressure to the rear or inboard side of the piston to reduce the propeller pitch; while in the structure shown in Fig. 2, pressure fluid applied to the front or outboard side of the piston turns the blade to reduce the pitch and pressure fluid applied to the rear or inboard side of the piston increases the propeller pitch.

The propeller shown in Fig. 1 comprises a hub 10 secured on shaft 12 (which may be a part of the engine crankshaft or a separate propeller shaft) and retained in position thereon by the usual cones 14 and retaining nut 16. Hub 10 carries a plurality of blades 18, three in the modification shown, mounted for pitch changing movement on bearings 20 in hub socket 22. Each blade 18 is provided with a gear segment 24 which meshes with common gear 26 for simultaneously turning all the blades to vary their pitch. Gear 26 is actuated by and may be integral with a cam 28 which is turned by the action of cam followers 30 movable by a piston 32 and cooperating with both cam 28 and a fixed cam 34. For a more detailed description of the cam and cam followers reference may be made to Caldwell et al. Patent No. 2,174,717 or Martin et al. Patent No. 2,280,713.

Piston 32 is slidable, by a preponderance of oil under pressure on one side or the other, in a cylinder formed by dome 36. Piston 32 is in the form of an annulus and, in the center, slides over a sleeve 38 which will be described in detail below. Piston 32 is shown as sealed at the cylinder and at the sleeve by O-ring seals. From the above description it is apparent that a preponderance of oil pressure on either side of piston 32 will move the piston and cause a change in the pitch of the propeller blades.

Oil is conducted between a governor, driven in timed relation to said propeller and, shown schematically at 40, and piston 32 through two lines 42 and 44 and channels 46 and 48. The governor acts to selectively increase the pressure in one line and reduce the pressure in the other in order to move the piston 32 and control the propeller pitch to maintain constant speed. Oil under pressure in line 48 finds its way through channel 50, tube 52, tube 54 and holes 56 to the front side of the piston. When the governor introduces fluid through channel 48 to the front of the piston, channel 46 is connected, through a line 58, with a drain or sump 60 so that oil at the back of the piston may escape as the piston moves.

In order to move the piston in an outboard direction, to the right as shown in Fig. 1, oil under pressure is introduced into line 42 and line 44 is connected with the sump 60. Oil under pressure moves through channel 46 and passage 62 into the interior of sleeve 38 and through holes 64 finds its way to the rear of piston 32. As the front of the piston is then connected with drain, the piston is moved in an outboard direction until a sleeve 66 fixed to piston 32 contacts stops 68.

Stop 68 is formed from a bar having a hook formed at one end and pivotally connected at the other end to one end of sleeve 38. Any desired number of stops may be used, three being used in the preferred embodiment disclosed. The other end of sleeve 38 is threaded into a sleeve 70 which, in turn, is threaded into the end of engine shaft 12. Sleeve 70 holds the fluid distributing plug 72 in position and is itself held against backing out by a locking pin 74. Sleeve 38 is keyed to plug 76 which, in turn, is brazed to tube 54 which, in turn, extends forwardly to the outboard end of dome 36. As sleeve 66 is secured to piston 32, it is obvious that the pitch position at which the stop becomes effective is determined by the longitudinal position of stop 68. This longitudinal position can be adjusted by threading sleeve 38 which carries stop 68 into or out of sleeve 70 which, in turn, is secured against movement in the shaft 12. In order to move sleeve 38, a suitable wrench may be applied over the outboard end of tube 54 and through the interconnecting members, sleeve 38 may be turned by turning tube 54. The sleeve may then be anchored in position by any suitable locking means such as washer 78 secured to a threaded plug 80 which, in turn, is keyed by a snap ring 82 to dome 36. Stops 68 are maintained in an extended or active position by a wedge ring or anvil 84 urged by spring 86 into a supporting position under or within stops 68. A sleeve 88 adapted to slide over tube 54 connects wedge ring 84 with a piston 90 slidable within sleeve 38 outboard of plug 76. From the construction this far described, it is apparent that if oil under sufficient pressure is led to the chamber 92, it will force piston 90 and with it wedge ring 84 to the right compressing spring 86 and moving the wedge ring out from under stop 68. If, at this time, surface 94 of sleeve 66 is in contact with hook 96 of stop 68 and piston 32 is being urged in an outboard direction, pressure applied to the hook 96 being eccentric to the pivot 98 of stop 68 will move stop 68 about its pivot to force the stop inward to an inactive position, thus allowing sleeve 66 to slide over stop 68 and continue to a pitch position outside of the normal range. Although a large force may be applied by piston 32 to hook 96 of stop 68 this results in only a comparatively small force on wedge ring 84. Hence the comparatively small force required to move the wedge ring releases the comparatively large force exerted by the piston.

Oil under pressure applied through passage 62 to the interior of sleeve 38 and inboard of plug 76 is prevented from reaching chamber 92 by a valve 100, normally held in closed position by spring 102. Spring 102 is strong enough to prevent opening of valve 100 by the normal working pressures supplied by the governor of about 120–140 pounds per square inch differential between opposite sides of the piston 32 but this spring is weak enough so that a differential pressure of about 250 pounds per square inch will open valve 100. If auxiliary motor 104 and pump 106 are energized, oil under a pressure higher than that normally supplied by the governor will be supplied. This pressure will be above 250 pounds per square inch differential pressure and may be as high as 600 to 650 pounds per square inch. Oil under the higher pressure will be directed by the governor to passage 62 and will open valve 100. As soon as valve 100 is open, the larger area then exposed will immediately force the valve to its extreme position, thus opening passage 108 and permitting oil under the higher pressure to pass through passage 110 to chamber 92. The action of the high pressure pump 106 will, as more fully described in U. S. application Serial No. 464,621, now Patent No. 2,402,065, connect the opposite line 44 with drain, thus relieving the pressure on the outboard side of piston 32 and thus also relieving the pressure on the outboard side of piston 90. As described above, piston 90 will then act to remove wedge ring 84 from the position shown in Fig. 1 in which it holds stop 68 in active position. The higher pressure fluid which is led through passage 62 also acts on the inboard side of piston 32 so that as soon as stops 68 are released, the piston is immediately forced into its extreme position which may be determined by stops 112 as more fully described in above-mentioned U. S. Patent No. 2,174,717.

As the piston 32 continues outboard and sleeve 66 slides over stop 68, which is forced inward thereby, the propeller blades will turn toward a reverse pitch position and will remain in that position as long as the predominate pressure is supplied to the rear or inboard side of piston 32.

To unreverse the propeller after it has been placed in reverse pitch position, the governor 40 and pump 106 will be operated as described in application Ser. No. 464,621 to supply the predominate pressure to line 44 and passage 50 to the outboard side of piston 32, meanwhile, connecting the inboard side of piston 32 with a drain. Piston 32 and with it sleeve 66 are then forced to the left and piston 90 is likewise forced to the left permitting spring 86 to force wedge ring 84 to the left, thus urging stop 68 outward. As soon as surface 94 of sleeve 66 has passed inboard of hook 96 of stop 68, the stops will be forced outward through the action of the wedge ring 84 and, if the propeller is then turning, through the action of centrifugal force. If all the oil back of the piston 90 in chamber 92 has not escaped at the time the pressure on the outboard side of the piston is relieved, and valve 100 closes, the remainder of the oil will drain through passage 108 into chamber 114 connected with the outboard side of the piston. The pressure on this outboard side is already acting on the outboard side of piston 90, thus substantially balancing the pressure in chamber 92. Spring 86 will, therefore, force the wedge ring 84 into position under stops 68, thus forcing them into active position.

As soon as the propeller has been returned to normal pitch, it may then be either manually or automatically returned to the control of the governor with assurance that the pitch will remain within the preselected range until positive action is taken to force it outside of that range. As in Patent 2,174,717 and 2,280,713 cams 28 and 34 may be provided with knees or bends at about the normal high pitch or low pitch position where the slope of the cam is abruptly changed to reduce the length of the cam and also provide fast feathering or reversing. These knees will act as stops under some conditions but may sometimes be overrun. With the positive mechanical stops above described however the range of pitch change is positively limited.

Fig. 2 shows a modification of the mechanical stop positioned from the drive shaft in a manner similar to the device of Fig. 1 but in which the oil pressure at the outboard side of piston 32 is utilized to reduce the propeller pitch and the pressure of the inboard side of the piston is used to increase the propeller pitch. This, of course, requires a reversal of the governor connections 42 and 44 with the propeller and a reversal of the direction of rotation imparted by cam tracks and, if the mechanical stop is to be used to determine a low pitch position, the stop will also have to be reversed from that shown in Fig. 1. In the modification shown in Fig. 2, oil entering through channel 48 passes through passage 116 and to the rear of piston 32 to force the piston forward and thus increase the propeller pitch; while oil entering the center channel 46 passes through tube 118 and hole 120 to the front of piston 32 to move the piston in a pitch reducing direction. It will be noted that plug 122 in thus directing the governor oil to piston 32 in effect reverses the governor connections from those shown in Fig. 1.

In Fig. 2 threaded sleeve 124 and plug 122 replace sleeve 70 and plug 72 of Fig. 1. Sleeve 126 is threaded into and supported by plug 122. A ring 128 is held in position against longitudinal movement on sleeve 126 by a shoulder on the sleeve at one side of the ring and by tube 130 and snap ring 132 on the other side of the ring. A plurality of stops 68 are mounted on pivots 98 carried by ring 128. Sleeve 126 may be longitudinally adjusted by threading it into or out of plug 122. This adjustment may be made from the front of dome 36 by removing the covering plug 134, a snap ring 136, nut 138 and lock washer 140 and inserting a wrench into the hexagonal socket 142 secured in the end of sleeve 126. Lock washer and nut, 140, 138, when in locking position, lock sleeve 126 to sleeve 144 and plate 146 which, in turn, is secured to dome 36.

Wedge ring 84 is slidably mounted on sleeve 125 and is urged into a position under stops 68, to force them into active position, by a spring 86. Motion of the wedge ring is limited by a sleeve 148 which abuts ring 128. Rods 150 only one of which is shown pass through and are guided by ring 128, have a shoulder 152 at one end of the rods abutting a flange on sleeve 148 and at the other end of the rods are connected with a piston 90. A plug 76 secured to sleeve 126 forms a fluid-tight joint with sleeve 66 and thus defines a chamber 92 on one side of piston 90. Tube 118 is adjustably threaded into the interior of sleeve 126 and has a spring abutment 154 secured thereon. Spring 156 which seats on abutment 154 forces valve member 100 into contact with a seat formed on the interior of sleeve 126.

In a manner quite similar to that described in Fig. 1 when oil under a pressure higher than governor pressure passes through tube 118 to the front of the piston 32, valve 100 is forced off of its seat thus exposing a larger area of the valve which is immediately forced back to uncover a port 108 leading to chamber 92. Oil under pressure in chamber 92 forces piston 90 inboard or to the left in Fig. 2 which, in turn, moves wedge ring 84 to the left, thus releasing stops 68 which are forced around pivot 98 away from stop position by piston 32 so that piston 32 may be moved into an extreme range. The area back of valve 100 is vented through vent 155. Operation of this stop is the same as that described for the device of Fig. 1 and it is believed unnecessary to again recite the detail of operation.

The modification shown in Fig. 3 is similar to the device shown in Fig. 1 in that oil under pressure on the inboard side of piston 32 changes the blade pitch to reduce the pitch; but in Fig. 3, the stop mechanism is supported and adjustable with respect to dome 36 instead of shaft 12 as in the two previous modifications. In the device shown in Fig. 3, oil in channel 48 is led through channel 50 in plug 157 to the interior of tube 158 and thence through hole 160 and 162 to the outboard side of piston 32, and oil is led from channel 46 to channel 164 and passages 166 in plug 157 and around the inboard end of sleeve 66 to the rear of piston 32. Stops 68 are pivotally mounted by means of pivots 98 on sleeve 168 which is supported from and adjustably mounted on dome 36 by being threaded to sleeve 170 which is secured to the dome. A snap ring and lock 172 is used to secure sleeve 168 against rotation with respect to the dome. Wedge ring 84 is fixed on a tube 174 carrying a piston 90 at one end thereof and slidably supported in a plate 176 or bulkhead secured to the inboard end of sleeve 168. Spring 86 is compressed between plate 176 and nut 178 threaded onto the end of tube 174, and urges the tube and wedge ring 84 inboard, to the left in Fig. 3, into position under stops 68 thus forcing them outward to active position. A plug 176 secured in the outboard portion of sleeve 168 defines a chamber 92 at the inboard side of piston 90. A cylinder is provided in the outboard end of sleeve 168 in which piston 90 is adapted to slide. Nut 180 threaded into an outboard extension of piston 90 acts as an adjustable abutment for spring 182. A valve 100 slidably mounted on tube 158 is subjected to the pressure acting on the inboard side of piston 32 and when that pressure exceeds a predetermined amount is opened to uncover port 108 and admit fluid under pressure to the inboard face of piston 90, thus forcing that piston and tube 174 and wedge ring 84 outboard, to the right in Fig. 3, to remove the wedge ring from under stops 68, thus permitting retraction of the stops by the action of piston 32 in the manner described above. From the above description, it will be apparent that the device in Fig. 3 is supported on, and is adjustable with respect to, dome 36 and is removable as a unit either with the dome or may be threaded into position or removed with the dome in assembled position. Suitable sealing means are provided between the removable and nonremovable portions to provide fluid-tight joints. In the embodiment shown the sealing is accomplished by providing O-ring seals in grooves carried by the perimeter of the bulkhead 176 and the perimeter of a collar on the end of hollow rod 158 that fits into passage 50.

It is to be understood that the invention is not limited to the specific embodiment herein illustrated and described, but may be used in other ways without departure from its spirit as defined by the following claims.

I claim:

1. A stop for pitch changing mechanism of a propeller having a hub comprising, means fixed with respect to said hub, a pitch changing motor having a part movable with respect to said means along a predetermined path, a lever pivoted on said means and having a projection extending into said path, the axis of said pivot being transverse to and to one side of said path so that when said motor urges said part into contact with said projection said lever is urged to move about said pivot and withdraw said projection from said path, means for holding said projection in said path, against said urge, to limit movement of said part, and hydraulically actuated means for disabling said holding means.

2. A pitch stop for an hydro-controllable pitch propeller comprising, pitch changing means, including mechanism having a shoulder movable through a predetermined path relative to a fixed structure, a hook pivotally mounted on said fixed structure having its pivot axis extending transversely of and located to one side of said path, means for forcing said hook into active position in said path, said shoulder being movable through said path away from said pivot and into engagement with said hook, and hydraulic means actuated by pitch changing hydraulic fluid for disabling said hook forcing means.

3. In a propeller having pitch-changing mechanism operably connected to propeller blades for changing the blade pitch through a total pitch range and having a member movable through a predetermined path relative to a fixed structure, stop means operably associated with said pitch-changing mechanism for limiting the blade pitch changes to a range less than the total range comprising, a hook pivotally mounted on said structure having its pivot axis extending transversely of and located to one side of said path, said member being movable through said path away from said pivot and into engagement with said hook, said hook constructed and arranged so that the pitch changing mechanism when stopped by said hook exerts a comparatively large force longitudinally of said hook and through said pivot and exerts a comparatively small force urging said hook into an inoperative position, means holding said hook in stopping position against the comparatively small force of the pitch-changing mechanism urging the hook into inoperative position, and means for disabling said holding means.

4. In combination with a propeller having a hub fixed against longitudinal movement on a shaft and having a pitch changing mechanism operable to control pitch changes, said pitch changing mechanism including a sleeve having a shoulder and slidable longitudinally of said shaft, stop means including a hook positioned within said sleeve and engageable with said shoulder on said sleeve, a pivot for said hook, a support for said pivot including a member having a threaded engagement with said shaft, means for threading said support into or out of said shaft to locate the active position of said stop means, means for holding said hook in the path of said shoulder and means for disabling said holding means.

5. In combination with a propeller having a hub fixed against longitudinal movement on a shaft and having pitch changing mechanism operable to control propeller pitch changes, said pitch changing mechanism including a sleeve having a shoulder and slidable longitudinally of said shaft, stop means including a pivoted hook positioned within said sleeve and engageable with said shoulder on said sleeve, means for holding said pivot against longitudinal movement with respect to said shaft, means for holding said hook in the path of said shoulder, spring means urging said holding means into holding position, and hydraulically actuated means within said sleeve operatively connected with said holding means for disabling said holding means.

6. In a combination with a propeller having a hub fixed against longitudinal movement on a shaft and having a pitch changing mechanism operable to control pitch changes, said pitch changing mechanism including a sleeve having a shoulder and slidable longitudinally of said shaft, stop means including a hook positioned within said sleeve and engageable with said shoulder on said sleeve, a pivot for said hook, a support for said pivot including a member having a threaded engagement with said shaft, means for threading said support into or out of said shaft to locate the active position of said stop means, locking means mounted on said support for positively holding said hook in the path of said shoulder, spring means urging said locking means into locking position and hydraulically actuated means, mounted on said support, located within said sleeve, and operatively connected with said locking means for disabling said locking means.

7. A controllable pitch propeller comprising blades rotatably mounted for pitch changing movements, hydraulically actuated means for rotating said blades through a predetermined total range, means for supplying hydraulic fluid at a lower and at a higher pressure to said hydraulically actuated means, intermediate stop means for limiting the extent of movement of said blades by said lower pressure, to less than the total range, comprising a mechanical stop movable into the path of a portion of said hydraulically actuated means, means for holding said stop in said path, hydraulic means for disabling said holding means including a channel hydraulically connecting said hydraulic disabling means with said hydraulically actuated means, a spring pressed valve operable at said lower pressure to block said channel but actuatable by said higher pressure to open said channel, to thereby energize said hydraulic disabling means and disable said stop holding means.

8. A controllable pitch propeller comprising a hub, propeller blades carried by said hub and mounted for pitch changing movements, a dome extending outwardly from and substantially coaxial with said propeller, pitch changing mechanism, having a longitudinally movable sleeve enclosed by said dome, mechanism within said sleeve and extending longitudinally through said sleeve and supported at one end by said shaft and at the other end by said dome, said mechanism comprising a mechanical stop engageable with said sleeve for positively limiting the extent of movement of said sleeve, means for positively holding said stop in engaging position and means for disabling said holding means.

9. A device as claimed in claim 8 in which said mechanism includes a support for holding said stop against longitudinal movement, said support having a screw threaded connection with said propeller for adjusting the longitudinal position of said stop and having a portion adjacent said dome, means for locking said support to said dome to prevent movement on said threaded connection and hold said support in adjusted position.

10. A device as claimed in claim 8 in which said mechanical stop is held against longitudinal movement on a support and in which said support has a screw thread engagement with said shaft on one end for adjusting the longitudinal position of said support and is locked to said dome at the other end to hold said support in adjusted position.

11. A device as claimed in claim 8 in which said mechanical stop is held against longitudinal movement on a support and in which said support has screw threaded engagement with said dome for adjusting the longitudinal position of said support, and has means for locking said support to said dome to hold said support in adjusted position.

12. A controllable pitch propeller having a double-acting hydraulic pitch changing motor, means for supplying fluid under pressure to either side of said motor including means for supplying fluid at one pressure to change the propeller pitch within a predetermined range, and means for supplying fluid at a higher pressure to move the blades into a range beyond said predetermined range, mechanical stop means for positively determining one limit of said predetermined range, means for holding said stop means in active position, hydraulically actuatable means for disabling said holding means including a valve having a predetermined area exposed to the pressure on one side of said motor, means for holding said valve closed against the action of said one pressure but ineffective to hold said valve closed against said higher pressure, a piston movable in a cylinder and connected with said disabling means said valve when open having an increased area exposed to pressure and directing fluid to said piston to actuate said disabling means.

13. In a controllable pitch propeller a pitch changing motor comprising a cylinder, a double acting piston and a bulkhead dividing said cylinder, said piston movable within said cylinder and over said bulkhead in pitch changing movements, retractable mechanical stops carried by said bulkhead for selectively limiting motion of said piston, tubular means passing through said bulkhead, hydraulically actuated means for disabling said stop, a valve slidable on said tubular means for controlling said hydraulically actuated means, said valve having a predetermined area exposed when closed and a larger area exposed when open, said valve being exposed to the pressure on one side of said piston, means for holding said valve closed against a predetermined pressure but ineffective to hold said valve closed against a higher pressure, and means for supplying fluid at said higher pressure to said one side of said piston.

14. In a controllable pitch propeller, a pitch changing motor comprising a cylinder, a bulkhead, and a double acting piston movable within said cylinder and over said bulkhead in pitch changing movements, means adjustably securing said bulkhead to said propeller, retractable mechanical stops pivotally mounted on said bulkhead and movable into the path of said piston, an anvil movable under said stops to hold them in said path of said piston, tubular means passing through said bulkhead, a second piston slidable over said tubular means, means associated with said second piston forming a chamber at one side thereof, means connecting said second piston and said anvil, a valve slidable over said tubular means, having a port leading to said chamber, and operative in one position to connect said chamber with one side of said double acting piston and in another position to connect said chamber with the other side of said double acting piston, the side of said second piston opposite said chamber being continuously connected with said one side of said double acting piston, means for actuating said valve to connect said chamber with said other side of said double acting piston and withdraw said anvil from under said stops.

15. A mechanical intermediate stop comprising a cylinder, an apertured piston movable longitudinally in said cylinder, means extending longitudinally through the aperture in said piston and adjustably secured at opposite ends to said cylinder, stops adjustable with said means and comprising hooks pivotally mounted on said means, means secured to said piston and having a shoulder movable past the pivots of said stops and into contact with said stops for positively limiting the movement of said piston, means for mechanically extending said stops into piston movement limiting position and holding them in extended position, means for disabling said holding means.

16. A mechanical intermediate stop comprising a cylinder, an apertured piston movable longitudinally in said cylinder, means extending longitudinally through the aperture in said piston and adjustably secured at opposite ends to said cylinder, stops adjustable with said means and comprising hooks pivotally mounted on said means, means secured to said piston and having a shoulder movable past the pivots of said stops and into contact with said stops for positively limiting the movement of said piston, means for mechanically extending said stops into position movement limiting position and holding them in extended position, means for disabling said holding means, said stops constructed and arranged so that pressure of said shoulder on said hooks will retract said stops when said holding means is disabled.

17. The combination comprising a cylinder, an apertured piston longitudinally movable in said cylinder, a unit insertable through the aperture in said piston, means adjustably fixing one end of said unit in said cylinder, said unit comprising mechanical stop means extendable into the path of said piston, means for extending said stop means and holding it in extended position and means for disabling said holding means.

18. The combination comprising a cylinder, an apertured piston hydraulically movable longitudinally in said cylinder, a unit insertable through the aperture in said piston and supported at both ends in said cylinder, including means at one end for longitudinally adjustably positioning said unit with respect to said cylinder, mechanical stops carried by said unit and extendable into the path of said piston, means for extending said stops and holding them in extended position, said unit including means for disabling said holding means and a pressure actuated valve for controlling said disabling means, said unit also including means for conducting actuating fluid through said piston.

19. A pitch stop for a hydro-controllable pitch propeller comprising, a pitch changing means movable through a predetermined path relative to a fixed structure, a hook mounted for movement about a pivot carried by said fixed structure, spring actuated wedge means operatively associated with said hook and urged into active position by said spring for forcing said hook about said pivot into position in said path to restrain movement of said pitch changing means and hydraulic means actuated by pitch changing hydraulic fluid for moving said wedge means into inactive position.

GEORGE W. FORMAN.

REFERENCES CITED

The following references are of record in the file of this patent:

UNITED STATES PATENTS

| Number | Name | Date |
|---|---|---|
| 585,649 | Brinkman | July 6, 1897 |
| 2,348,764 | Thomas | May 16, 1944 |
| 2,368,950 | Thomas | Feb. 6, 1945 |

FOREIGN PATENTS

| Number | Country | Date |
|---|---|---|
| 47,209 | Netherlands | Nov. 15, 1939 |
| 496,038 | Great Britain | Nov. 23, 1938 |
| 499,514 | Great Britain | Jan. 25, 1939 |
| 519,261 | Great Britain | Mar. 20, 1940 |